April 4, 1967 L. E. CHASSEVENT ETAL 3,312,455
METHOD AND APPARATUS FOR CALCINING GYPSUM IN TWO STAGES
Filed Dec. 3, 1964
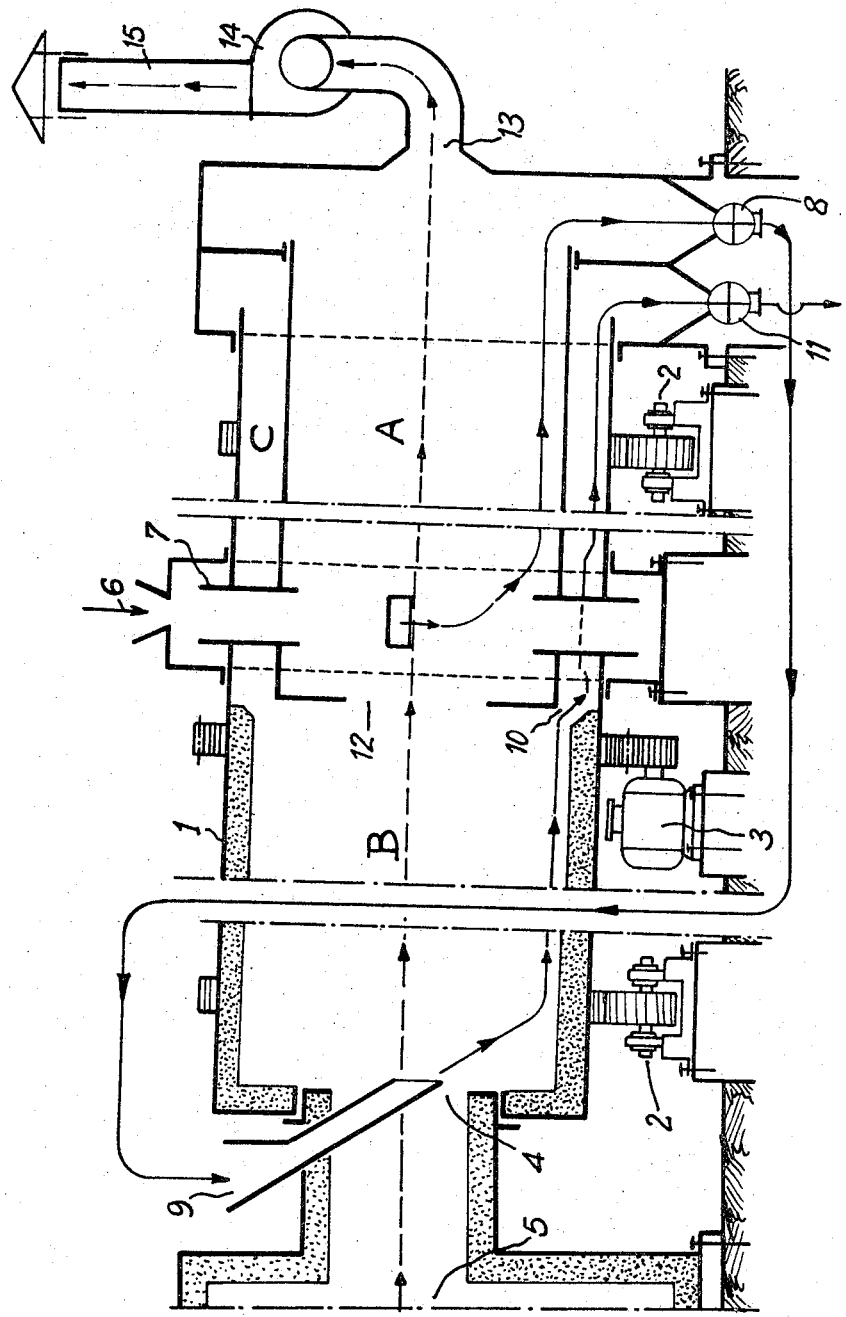
INVENTORS
LOUIS EMILE CHASSEVENT AND
NOËL GOULOUNES
By Linton and Linton
ATTORNEYS 3,312,455
METHOD AND APPARATUS FOR CALCINING
GYPSUM IN TWO STAGES
Louis Emile Chassevent, Cormeilles-en-Parisis, and Noël Goulounès, Itteville, France, assignors to Lambert Freres & Cie, Cormeilles-en-Parisis, France, a company of France
Filed Dec. 3, 1964, Ser. No. 415,623
Claims priority, application France, Dec. 12, 1963, 956,967, Patent 1,386,464
4 Claims. (Cl. 263—32)

Gypsum is calcined, in industry, in numerous types of furnace for discontinuous or continuous operation. Unfortunately none of these types permit the satisfaction simultaneously of all the essential conditions which are desired in the industry, in particular the following:

(1) Obtaining a plaster having a composition and properties which are constant;
(2) Low consumption of fuel, driving power and manual labour;
(3) Large scale production;
(4) The purchase and maintenance of the furnace not requiring too high an expenditure.

With all furnaces for plaster using indirect heating—either for discontinuous operation (boiler type furnaces and drum type furnaces), or for continual operation (rotary furnaces)—the costs of installation and maintenance are high and it is impossible to manufacture calcined plaster at high temperature (from 250° to 1000° C.). Moreover, boiler type furnaces for plaster require a high expenditure of fuel and of the driving power and give rise moreover, to difficulties which are well known for discontinuous manufacture.

With furnaces for plaster with direct heating, it is very difficult to obtain in practice a well defined and a consistent quality product. This difficulty also arises equally as much in calcining gypsum in powder form in rotary furnaces as in the calcining of large particles in vertical furnaces similar to kilns for limestone. At the end of the calcining process the gypsum is in contact with the combustion gases at very high temperatures (1000° to 1300° C. generally). The finest grains endure higher temperatures and are thus more calcined than the largest grains. The same applies to vertical furnaces where the particles are more calcined at the surface than at the centre. There is thus obtained, after calcining and pulverisation, a product which is a mixture of various constituents in variable proportions, as a result of the variations in the degree of fineness and the hardness of the gypsum and as a result of the variations in the temperature and the quantity of combustion gases which cannot be avoided completely in practice.

The present invention enables the avoidance of the whole of the difficulties referred to above by a novel process for calcining plaster in several phases which can be explained, for convenience of description, by referring to a furnace (of the rotary type) for carrying out the process, although the invention is not limited to a construction of a particular type of furnace. According to the invention the furnace for the manufacture of plaster is constituted by several parts. In a first compartment (preheating compartment), the gypsum, having been previously pulverised, is dried and preheated by the gases which have been used for the calcining, this constituting the first phase of the process. The preheated gypsum leaving the compartment is then conveyed and introduced to the other end of the furnace (from the side of the hearth or of the burner) and circulates in the second compartment (calcining compartment) in the same sense as that of the combustion gases, this constituting the second phase of the process. At the exit of this calcining compartment, the plaster is at a temperature little different from that of the gases (of the order of 1200° C.), this providing a product which is well defined and of consistent quality. The plaster, at the exit of the calcining compartment, may pass to a third compartment (cooling compartment) where it is cooled down, giving up part of its heat to the gypsum in the first compartment or to the air which is used for combustion, this constituting a third phase of the process.

In order to fully understand the invention, reference is made hereinafter to an accompanying diagrammatic drawing of which the sole figure shows a rotary furnace, the scheme of the circulation of gypsum to be calcined and of the plaster obtained and the scheme of the circulation of the heating gases as in the use of the invention.

The rotary furnace 1 shown in the figure and resting on rotary roller supports 2 is driven by the device 3. This furnace is constituted by three compartments A, B, and C in which the path of circulation of the gypsum is indicated by full lines and the path of circulation of the heating gases by broken lines. In this example, the calcining compartment B extends from the end 4 of the furnace associated with the hearth or with the burner 5 and the cooling compartment C which lies at the opposite end around the preheating compartment A.

The crude and previously pulverised gypsum is introduced continously at 6 and it passes, by means of the device 7 into the compartment A of the rotating furnace. In this compartment the gypsum is dried and preheated on the one hand directly by the gases leaving the compartment B and on the other hand indirectly by the cooling of the plaster circulating in the compartment C.

The gypsum which has been dried and preheated leaves the compartment A at 8. It is then transported and introduced at 9 into the compartment B at the side of the hearth. The gypsum is then, in the compartment B, first of all placed in contact with the very hot gas (preferably from 1000° to 1300° C.) in order to obtain a good thermal efficiency. The grains of gypsum are not subjected to a very high temperature, in spite of the very high temperature of the gases, because these grains, which are not yet dehydrated, absorb the heat transmitted by losing their water or crystallisation. The gases and the solid circulate in the same sense in the compartment B, that is to say from left to right in the figure. Their temperatures, initially widely different, approach in proportion to their progress in the furnace in order to reduce the differences on leaving the compartment B because of the initimate contact effected between the solid granules and the combustion gases. The calcined plaster leaves the compartment B at 10. It is then cooled down by circulating in the compartment C where it gives up its heat to the cold gypsum contained in the compartment A. The calcined plaster which has been cooled is continuously extracted from the compartment C at 11. The gases leaving the compartment B at 12 pass into the compartment A where they dry and preheat the gypsum, then they leave the furnace at 13 at low temperature, the removal being assisted by a fan 14 and a chimney flue 15. A dust removal apparatus or chamber for the gases is inserted between 14 and 15.

Thus as has been indicated with reference to the accompanying figure, the plaster has, on completion of the calcining at 10, a temperature little less than that of the gases at 12. Thus there is obtained a plaster of which all the grains have been subjected to the same temperature and hence a well defined product of consistent quality and not a mixture of various constituents in variable proportions as was achieved with heating furnaces using direct contact up to the present for the calcining of plaster. Moreover, the thermal efficiency is very good and the production rate considerable because it is possible to utilise the gases at very high temperatures (1000° to 1300° C.) which are removed at low temperatures (between 60° and 120° C.).

The present invention presents moreover the advantage of equally well enabling the manufacture, with the same furnace, of plasters which are calcined at low temperatures (between 140° C. and 250° C.) as well as those which are calcined at high temperatures (between 250° C. and 900° C.).

What we claim is:

1. A method for calcining gypsum in two stages by clean combustion gases, comprising the steps of pulverizing gypsum into a powdered condition, producing a supply of clean combustion gases from a fluid fuel, passing in a first stage the pulverized gypsum thus obtained through a drying and preheating zone together with and in the same direction as with a flow of said combustion gases taken from the second stage whereby the gas which contains water vapor does not have its temperature lowered such as to cause condensation of water onto the gypsum to be converted into plaster, subjecting the dried and preheated gypsum thus obtained to the second stage by passing it through a further heating zone together with said combustion gases taken from the supply thereof with said combustion gases travelling in the same direction as the gypsum at a continuously decreasing temperature, whereby plaster is thus obtained nearly at the same final temperature as the combustion gases leaving said further heating zone and finally cooling the plaster obtained from said gypsum calcined in said second stage.

2. Method as claimed in claim 1, including a third stage in the course of which the calcined hot plaster is cooled, by passing said calcined hot plaster from said second stage into a cooling zone separate from, but in heat transfer contact with and along said drying and preheating zone whereby said hot plaster progressively gives up its heat to the gypsum being preheated and being subjected to the first stage of the calcining process.

3. An apparatus for calcining gypsum, comprising a rotary kiln with an inlet end and an outlet end for heating combustion gases, a calcining compartment in said kiln extending from said inlet end to an intermediate point of said kiln, means for discharging plaster obtained from said calcined gypsum, from said calcining compartment at said intermediate point, a drying and preheating compartment in said kiln extending from said intermediate point to said outlet, said drying and preheating compartment having a passage in communication with said calcining compartment for gases flowing from said calcining compartment to pass into said drying and preheating compartment, said kiln having a passage for introducing crude gypsum into said drying and preheating compartment at one end thereof adjacent said drying and preheating compartment passage and means for transferring dried and preheated gypsum from the other end of said drying and preheating compartment to said calcining compartment at said inlet end of said kiln.

4. An apparatus for calcining gypsum as claimed in claim 3, including an annular cooling compartment surrounding and in heat transfer contact with and along said drying and preheating compartment, means for supplying the plaster which is discharged from said calcining compartment into said annular cooling compartment around said one end of said drying and preheating compartment where crude gypsum is introduced and means for discharging cooled plaster from said annular compartment around said other end of said drying and preheating compartment.

References Cited by the Examiner

UNITED STATES PATENTS 1,912,810   6/1963   Wechter _____ 263—32

FOREIGN PATENTS 1,292,406   3/1962   France.

FREDERICK L. MATTESON, JR., *Primary Examiner.*

JOHN J. CAMBY, *Examiner.*